(12) United States Patent
Aloush

(10) Patent No.: US 9,094,232 B2
(45) Date of Patent: Jul. 28, 2015

(54) ALLOCATION ADJUSTMENT IN NETWORK DOMAINS

(75) Inventor: Avner Aloush, Netanya (IL)

(73) Assignee: SIGMA DESIGNS ISRAEL S.D.I. LTD., Tel Aviv (IL)

(*) Notice: Subject to any disclaimer, the term of this patent is extended or adjusted under 35 U.S.C. 154(b) by 399 days.

(21) Appl. No.: 12/978,724

(22) Filed: Dec. 27, 2010

(65) Prior Publication Data

US 2011/0158262 A1  Jun. 30, 2011

Related U.S. Application Data

(60) Provisional application No. 61/290,226, filed on Dec. 27, 2009.

(51) Int. Cl.
*H04J 3/06* (2006.01)
*H04L 12/66* (2006.01)
*H04L 12/403* (2006.01)
*H04L 12/801* (2013.01)

(52) U.S. Cl.
CPC .............. *H04L 12/403* (2013.01); *H04L 47/10* (2013.01)

(58) Field of Classification Search
CPC .............................. H04L 47/10; H04L 12/103

USPC .......................................... 370/252, 353, 503
See application file for complete search history.

(56) References Cited

U.S. PATENT DOCUMENTS

| 6,795,418 | B2 | 9/2004 | Choi | |
| 8,089,982 | B1* | 1/2012 | Vleugels et al. | 370/447 |
| 2002/0041570 | A1* | 4/2002 | Ptasinski et al. | 370/252 |
| 2007/0153690 | A1 | 7/2007 | Stanwood | |
| 2007/0275723 | A1* | 11/2007 | Jeong et al. | 455/436 |
| 2008/0232339 | A1* | 9/2008 | Yang et al. | 370/342 |

* cited by examiner

*Primary Examiner* — Shripal Khajuria
*Assistant Examiner* — Farhad Ali
(74) *Attorney, Agent, or Firm* — Eitan, Mehulal & Sadot

(57) ABSTRACT

A network node in a resource reservation network includes a data receiver, a transmitter and a timing adjustment requester. The data receiver receives fixed size application protocol data units (APDUs) from an application at fixed intervals. The transmitter transmits data from the network node to the network within transmission opportunities (TXOPs) associated with a constant data service flow for the application specified associated with the application and the network node in a media access plan (MAP) generated by a network scheduler. The timing adjustment requester requests adjustments of the network scheduler to the timing of TXOPs associated with the constant data service flow in order to minimize a delay between the arrival of the APDUs and their transmittal to the network.

9 Claims, 4 Drawing Sheets

US 9,094,232 B2

ALLOCATION ADJUSTMENT IN NETWORK DOMAINS

CROSS-REFERENCE TO RELATED APPLICATIONS

This application claims benefit from U.S. Provisional Patent Application No. 61/290,226, filed Dec. 27, 2009, which is hereby incorporated in its entirety by reference.

FIELD OF THE INVENTION

The present invention relates to allocation of transmission opportunities generally.

BACKGROUND OF THE INVENTION

There are many different types of data networks, of which Ethernet is perhaps the best known. Some data networks, such as HPNA (Home Phoneline Network Alliance) v.3, HomePlug AV and G.hn networks, have resource reservation schemes. Resource reservation networks have a scheduler to guarantee media resources to network nodes, to prevent collision between multiple network nodes using the same line and to ensure quality of service.

An exemplary resource reservation network is shown in FIG. 1A and an exemplary schedule is shown in FIG. 1B, to which reference is now made. Four network nodes 5 are shown, one of which, the domain master, has a scheduler 6. Each network node 5 is connected to a computing device of some kind, which computing device has at least one software application, labeled 8, running at any time. Software applications 8 generate data, in the form of application protocol data units (APDUs) or data packets, which are to be transmitted along a network medium 7. Each computing device may be running multiple applications 8, each of which may generate a "service flow" through the associated network node 5.

Scheduler 6 receives bandwidth allocation requests from nodes 5 and then creates and sends to each network node 5 a media access plan (MAP) for each media access (MAC) cycle 10 (FIG. 1B). Each MAP is a detailed schedule of future transmission opportunities (TXOPs) that will be made available to all network nodes in the upcoming MAC cycle described by the MAP and allocates each opportunity to a particular service flow. The MAP details the start time and length of each and all scheduled TXOPs in the next cycle of transmissions, and assigns each TXOP to a particular network node.

Within data networks, there are generally three types of services, variable bit-rate (VBR) services, best effort (BE) services and constant data services. For VBR services, such as a video stream, the amount of data to be transferred varies from transmission to transmission. Best effort services are transmitted during contention periods (CPs) during which the services to be transmitted contend for access to the network. Thus, only those that access the network get transmitted and their level of service is not guaranteed. The data is typically transmitted with a variable number of bits per cycle.

For constant data services, there is a constant amount of data being transferred at any given time with a fixed, known interval between packets. Exemplary constant data services are digital telephony transmissions, such as voice over IP (VoIP) which may generate APDUs, of a fixed size and may transmit the APDUs at fixed intervals. Scheduler 6 can easily schedule such a fixed interval activity, since the same amount of bandwidth is required for each transmission.

FIG. 1B illustrates the scheduling over a plurality of MAC cycles 10 for an exemplary fixed bit rate service. FIG. 1B shows a plurality of contention free transmission opportunities (CFTXOPs) 12 occurring at a regular rate. Accordingly, there is a fixed period of time T between any pair of CFTXOPs 12. As can be seen in FIG. 1B, fixed period of time T is maintained irrespective of where within each MAC cycle each CFTXOP 12 falls.

SUMMARY OF THE INVENTION

There is therefore provided, in accordance with a preferred embodiment of the present invention, a network node in a resource reservation network. The node includes a data receiver, a transmitter and a timing adjustment requester. The data receiver receives fixed size application protocol data units (APDUs) from an application at fixed intervals. The transmitter transmits data from the network node to the network within transmission opportunities (TXOPs) associated with a constant data service flow for the application specified in a media access plan (MAP) generated by a network scheduler. The timing adjustment requester requests adjustments from the network scheduler of the timing of the TXOPs associated with the constant data service flow in order to minimize a delay between the arrival of the APDUs and their transmittal to the network.

Moreover, in accordance with a preferred embodiment of the present invention, the timing adjustment requester includes a timing measurer to determine the delay as a function of an arrival time of at least one APDU and a transmittal time of its associated TXOP and to generate a requested shift of the timing of future TXOPs to closer to the arrival times of future APDUs.

Further, in accordance with a preferred embodiment of the present invention, the timing measurer includes an averager to average a difference between arrival time and transmittal times of associated TXOP for at least two APDUs.

Still further, in accordance with a preferred embodiment of the present invention, the timing adjustment requester includes a request generator to generate the request when the node did not utilize a TXOP allocated to it or the timing of the TXOP is too late beyond a configured threshold.

There is also provided, in accordance with a preferred embodiment of the present invention, a scheduler in a resource reservation network. The scheduler includes a request allocator and a timing adjuster. The request allocator receives bandwidth allocation requests from nodes of the network and generates a media access plan (MAP) addressing the requests. The MAP contains transmission opportunities (TXOPs) allotted to service flows associated with the nodes of the network. The timing adjuster receives adjustment requests for TXOPs associated with fixed interval applications of the nodes in order to minimize a delay between the arrival timing of the APDUs at the nodes and their transmittal by the nodes to the network and adjusts the timing of the TXOPs according to an amount of shift indicated in the adjustment requests.

There is also provided, in accordance with a preferred embodiment of the present invention, a method for a network node in a resource reservation network. The method includes receiving fixed size application protocol data units (APDUs) from an application at fixed intervals, transmitting data from the network node to the network within transmission opportunities (TXOPs) associated with a constant data service flow specified in the media access plan (MAP) generated by a network scheduler and requesting adjustments from the scheduler of the timing of TXOPs associated with the fixed interval flow in order to minimize a delay between the arrival of the APDUs and their transmittal to the network.

Moreover, in accordance with a preferred embodiment of the present invention, the requesting adjustments includes determining the delay as a function of an arrival time of at least one APDU and a transmittal time of its associated TXOP and generating a requested shift of the timing of future TXOPs to closer to the arrival times of future APDUs.

Further, in accordance with a preferred embodiment of the present invention, the determining includes averaging a difference between arrival times and transmittal times of associated TXOPs for at least two APDUs.

Finally, there is provided, in accordance with a preferred embodiment of the present invention, a method for a scheduler in a resource reservation network. The method includes receiving bandwidth allocation requests from nodes of the network, generating a media access plan (MAP) in response to the requests, the MAP having transmission opportunities (TXOPs) allotted to service flows associated with the nodes of the network, receiving adjustment requests for TXOPs associated with constant data service flows of the nodes in order to minimize a delay between the arrival timing of the APDUs at the nodes and their transmittal by the nodes to the network and adjusting the timing of TXOPs according to an amount of shift indicated in the adjustment requests.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1A:
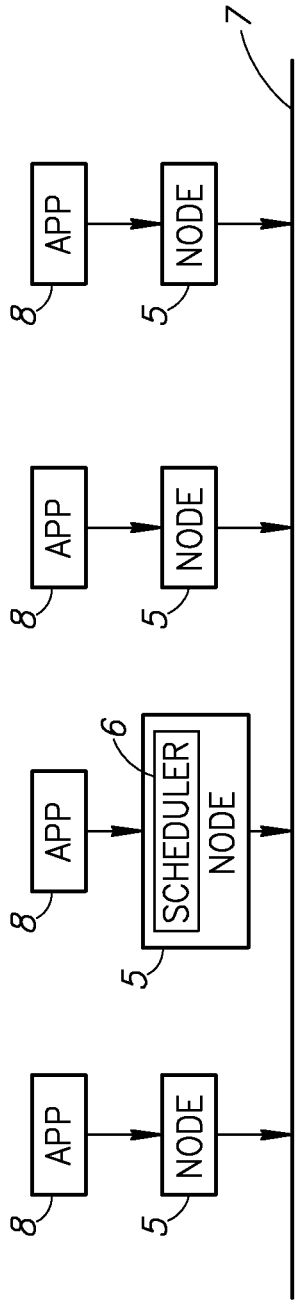
FIG. 1A is a schematic illustration of an exemplary resource reservation network.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Applicant has realized that, when the scheduler of the domain master allocates contention free transmission opportunities (CFTXOPs), the CFTXOP allocations typically are not synchronized with the actual generation of the application protocol data units (APDUs) from applications such as a voice over IP (VoIP) call. As Applicant has realized, this lack of synchronization may add a delay into the transmission, despite the fact that the domain master has allocated CFTXOPs at the requested rate, interval and size.

Figure 1B:
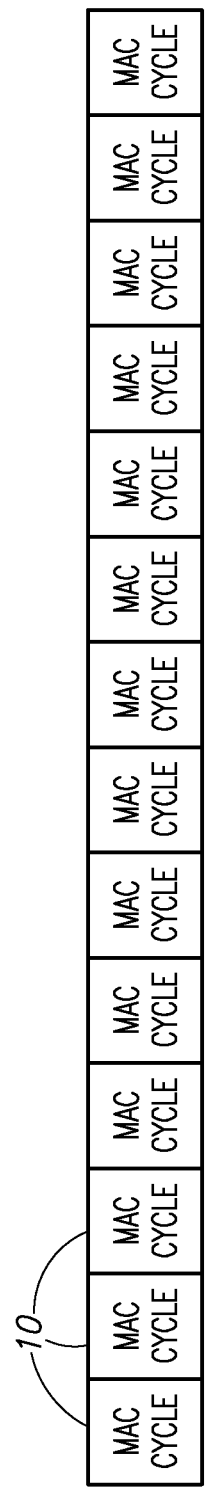
FIG. 1B is a schematic illustration of an exemplary schedule for fixed bit rate flow in the network of FIG. 1A.
Figure 2:
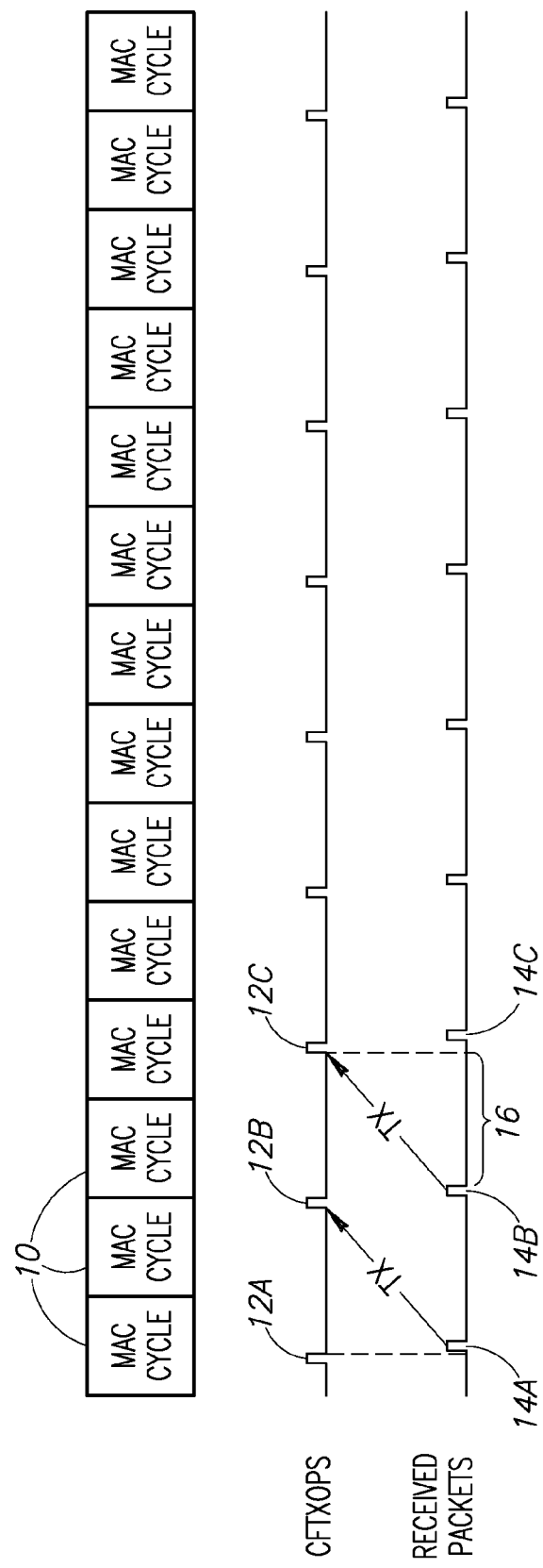
FIG. 2 is a schematic illustration of transmissions according to the schedule of FIG. 1B.

Reference is now made to FIG. 2, which illustrates an exemplary situation for the CFTXOPs for the constant data service flow of FIG. 1B. FIG. 2 also shows the timing of received packets 14, where three received packets 14A, 14B and 14C are identified. FIG. 2 also labels three of the CFTXOPs as 12A, 12B and 12C. As can be seen, the first received packet 14A arrives just after first CFTXOP 12A finishes, as indicated by the dashed line. Thus, the node to whom CFTXOPs 12 were allocated missed first CFTXOP 12A, because first received packet 14A was not ready for transmission before or during first CFTXOP 12A. Instead, the node will transmit first received packet 14A using second CFTXOP 12B. Similarly, the node will transmit second received packet 14B using third CFTXOP 12C. The result is a significant delay 16 added to the transmission time of each packet, despite the proper allocation of CFTXOPs 12. For time sensitive transmissions, such as IP telephone calls or E1 frames, this additional delay results in poor quality communications.

Figure 3A:
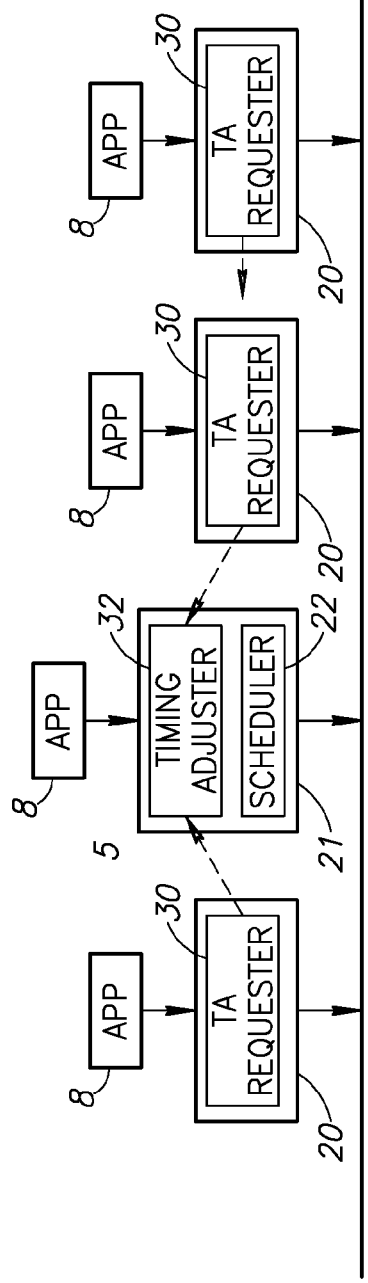
FIG. 3A is a schematic illustration of a novel resource reservation network, constructed and operative in accordance with a preferred embodiment of the present invention.

Applicant has realized that when the CFTXOP allocations are not synchronized with the received packets, it adds latency and jitter. Reference is now made to FIG. 3A, which illustrates an improved network, constructed and operative in accordance with a preferred embodiment of the present invention, in which network nodes, here labeled 20, may each comprise a timing adjustment requester 30 and the domain master, here labeled 21, may comprise a scheduler, here labeled 22, and a timing adjuster 32 to process timing adjustment requests with scheduler 22. With requesters 30 and adjuster 32, the network of FIG. 3A may have a reduced latency and jitter compared to that of the network of FIG. 1A.

Each requester 30 may compare an arrival time of a received packet 14 (as measured by a timestamp of received packet 14) to the allocated time of a next CFTXOP 12. If the next CFTXOP 12 has an allotted time significantly after the arrival time of the received packet plus any time needed to process the packet, then requester 30 may determine a shift for the CFTXOPs. The shift typically may be determined by the difference between the arrival time and the next CFTXOP allotted time or by such a difference over a small set of consecutive received packets 14. The shift may be defined as a significant portion of the determined time difference.

Each requester 30 may request that future CFTXOPs be shifted earlier by the determined amount of shift. Typically, each requester 30 may send such a request whenever the determined amount of shift may be above a predefined threshold. Moreover, each requester 30 may generate the shift request whenever the node did not utilize a TXOP allocated to it or when the timing of the TXOP is too late to be utilized beyond a configured threshold.

Adjuster 32 may receive the shift requests and may indicate to scheduler 22 to adjust the timing of the CFTXOPs for the particular network node or for the particular application on the particular network node accordingly.

Figure 3B:
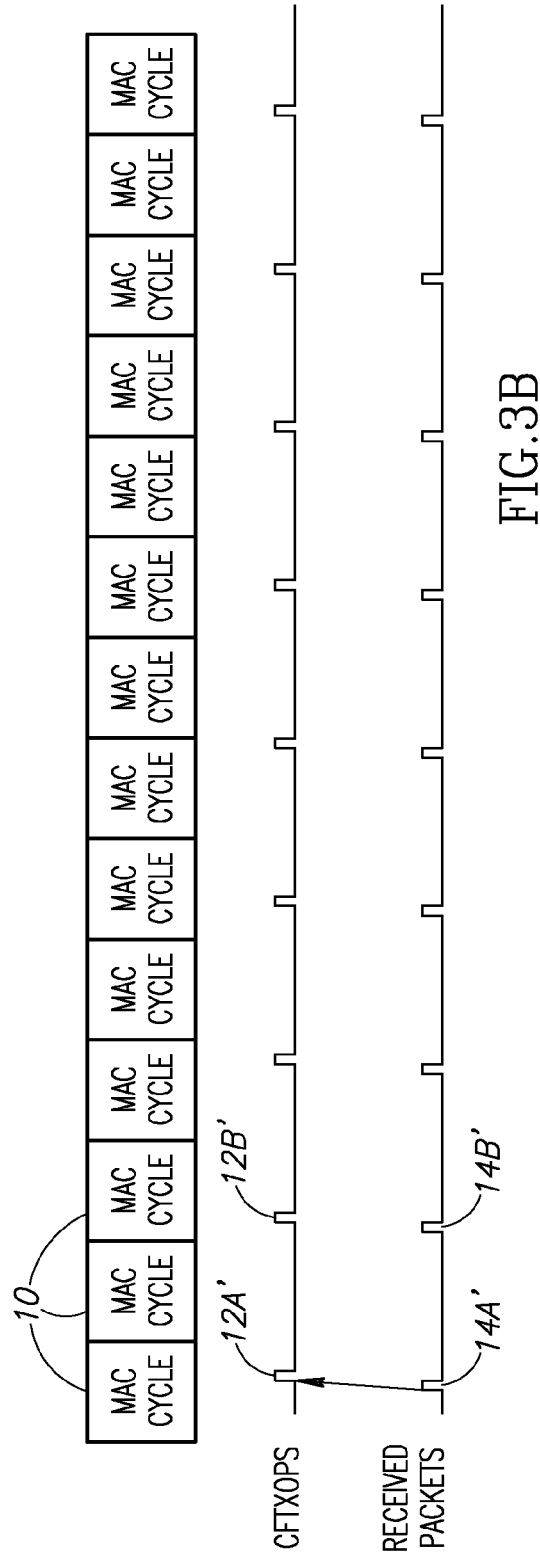
FIG. 3B is a schematic illustration of transmissions according to the schedule of FIG. 1B in the network of FIG. 3A.

FIG. 3B, to which reference is now made, illustrates a set of transmissions for the received packets 14 of FIG. 2 in the network of FIG. 3A, using the shift requests described hereinabove. In this example, the CFTXOPs are shifted later, such that CFTXOP 12A' occurs shortly after packet 14A is received. The result is that packets 14 may be transmitted to network medium 7 with minimal delay and jitter.

Table 1 lists the elements of a FL_ModifyFlowAllocations.req message sent by nodes 20 to adjust the CFTXOP allocations.

TABLE 1

Format of FL_ModifyFlowAllocations.req message

| Field | Octet Number | Length (Bits) | Description |
|---|---|---|---|
| FLOW_ID | 0 | 8 | The flow ID to which the domain master allocates CFTXOP allocations |
| Allocation_Adjustment | 1 | 16 | Signed Integer field contains the request allocation time adjustment in microseconds relative to the last allocation |

Note that the adjustment time correction is given as signed integer field and contains the required allocation time adjustment in microseconds relative to the last CFTXOP allocation.

Figure 4:
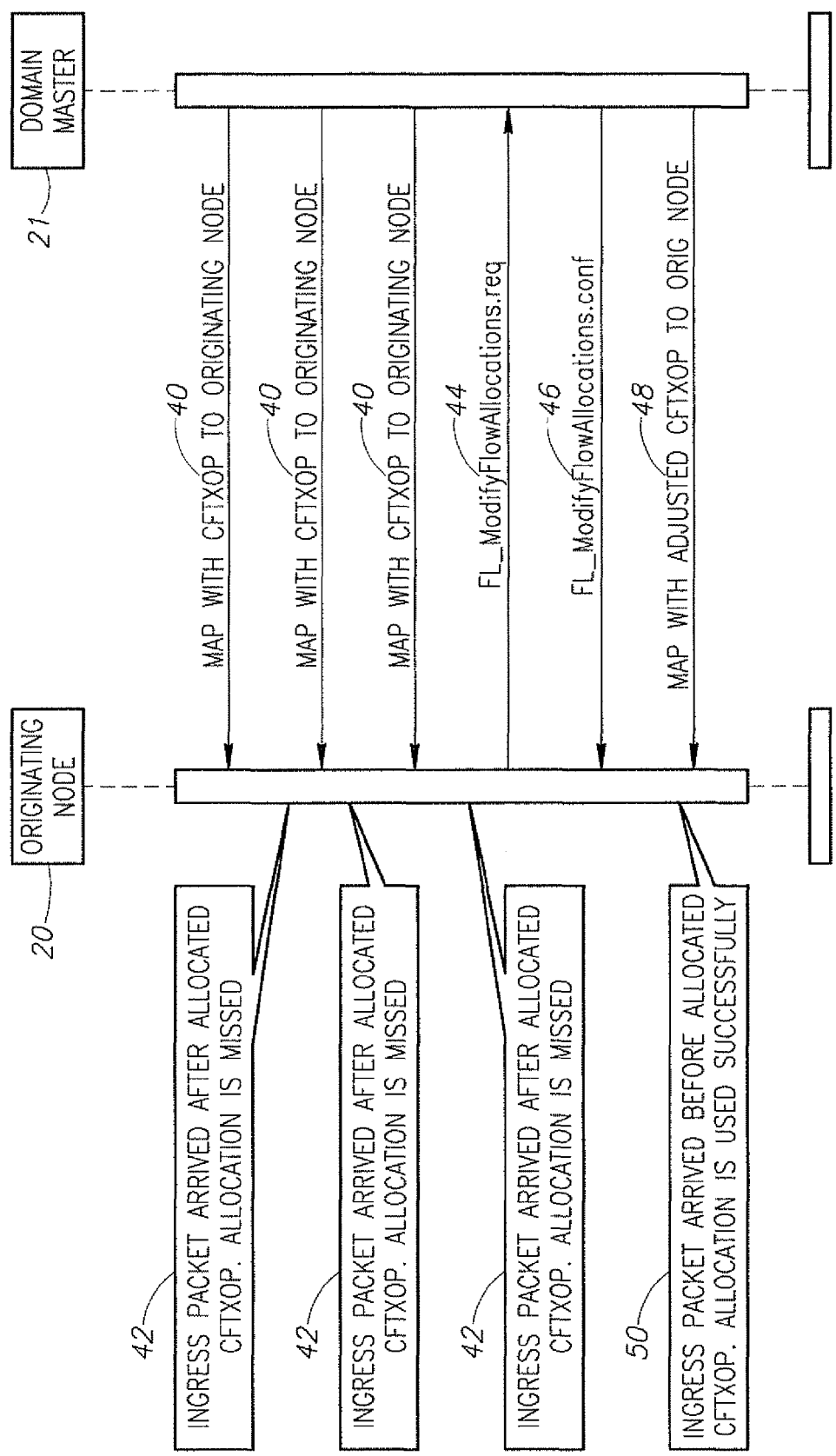
FIG. 4 is timing diagram illustration of operation within the network of FIG. 3A.

Reference is now made to FIG. 4 which describes an exemplary scenario beginning with unsynchronized allocations and the suggested protocol to more closely synchronize the CFTXOP allocations with the ingress traffic.

In step 40, a MAP containing a dedicated CFTXOP allocation is received at the originating node 20. In step 42, an ingress packet arrives after the allocated CFTXOP time and, accordingly, misses its allocation.

Steps 40 and 42 repeat with the next two MAPs, during which time the requester 30 of originating node 20 may determine how much of a shift is necessary.

In step 44, requester 30 may transmit the FL_ModifyFlowAllocations.req message to adjuster 32 in the domain master 21. In response (step 46), adjuster 32 may transmit a FL_ModifyFlowAllocations.conf confirmation message and the domain master 21 may also transmit (step 48), at the appropriate time, a next MAP with the adjusted CFTXOP allocation.

In step 50, the ingress packet may arrive before the allocated CFTXOP and may utilize the allocation successfully. It will be appreciated that the nodes may activate timing adjustment requesters 30 according to any appropriate schedule. The nodes may activate requesters 30 periodically or they may activate them randomly, as desired.

Unless specifically stated otherwise, as apparent from the preceding discussions, it is appreciated that, throughout the specification, discussions utilizing terms such as "processing," "computing," "calculating," "determining," or the like, refer to the action and/or processes of a computer, computing system, or similar electronic computing device that manipulates and/or transforms data represented as physical, such as electronic, quantities within the computing system's registers and/or memories into other data similarly represented as physical quantities within the computing system's memories, registers or other such information storage, transmission or display devices.

Embodiments of the present invention may include apparatus for performing the operations herein. This apparatus may be specially constructed for the desired purposes, or it may comprise a general-purpose computer selectively activated or reconfigured by a computer program stored in the computer. Such a computer program may be stored in a computer readable storage medium, such as, but not limited to, any type of disk, including floppy disks, optical disks, magnetic-optical disks, read-only memories (ROMs), compact disc read-only memories (CD-ROMs), random access memories (RAMs), electrically programmable read-only memories (EPROMs), electrically erasable and programmable read only memories (EEPROMs), magnetic or optical cards, Flash memory, or any other type of media suitable for storing electronic instructions and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A network node in a resource reservation network having a domain master having a network scheduler, the node comprising:

a data receiver to receive fixed size application protocol data units (APDUs) from an application at fixed intervals;

a transmitter to transmit data from said network node to said network within transmission opportunities (TXOPs) allocated to a constant data service flow for said application specified in a media access plan (MAP) generated by said network scheduler; and a timing adjustment requester to request from said scheduler shifting the timing of an existing allocation for subsequent said TXOPs allocated to said constant data service flow in order to minimize a delay between the arrival of said APDUs and their transmittal to said network, wherein said network node receives from said network scheduler an updated MAP with adjusted TXOP allocations.

2. The network node according to claim 1 and wherein said timing adjustment requester comprises a timing measurer to determine said delay as a function of an arrival time of at least one said APDU and a transmittal time during its allocated said TXOP and to generate a requested shift of said allocation for said subsequent TXOPs to closer to arrival time of future said APDUs.

3. The network node according to claim 2 and wherein said timing measurer comprises an averager to average a difference between arrival times and transmittal times of allocated TXOPs for at least two APDUs.

4. The network node according to claim 1 and wherein said timing adjustment requester comprises a request generator to generate said request when said node did not utilize a TXOP allocated to it or the allocation of the TXOP is too late beyond a configured threshold.

5. A scheduler in a domain master in a resource reservation network, the scheduler comprising:

a request allocator to receive bandwidth allocation requests from nodes of said network and to generate a media access plan (MAP) addressing said requests, said MAP having transmission opportunities (TXOPs) allocated to service flows associated with said nodes of said network; and a timing adjuster to receive requests for shifting the timing of an existing allocation of subsequent said TXOPs allocated to constant data service flows of said nodes in order to minimize a delay between the arrival timing of APDUs at said nodes and their transmittal by said nodes to said network and to shift said allocation of said subsequent TXOPs according to an amount of shift indicated in said allocation shifting requests, wherein said request allocator generates an updated MAP with adjusted TXOP allocations for transmitting said updated MAP to said nodes in said network.

6. A method for a network node in a resource reservation network having a domain master having a network scheduler, the method comprising:

receiving fixed size application protocol data units (APDUs) from an application at fixed intervals;

transmitting data from said network node to said network within transmission opportunities (TXOPs) allocated to a constant data service flow specified in a media access plan (MAP) generated by said network scheduler;

requesting from said network scheduler to shift the timing of an existing allocation of subsequent said TXOPs allocated to said constant data service flow in order to minimize a delay between the arrival of said APDUs and their transmittal to said network; and receiving from said network scheduler an updated MAP with adjusted TXOP allocations.

7. The method according to claim 6 and wherein said requesting to shift an allocation comprises:

determining said delay as a function of an arrival time of at least one said APDU and a transmittal time of its allocated said TXOP; and generating a requested shift of said allocation of said subsequent TXOPs to closer to arrival time of future said APDUs.

8. The method according to claim 7 and wherein said determining comprises averaging a difference between arrival times and transmittal times during allocated TXOPs for at least two APDUs.

9. A method for a scheduler in a domain master in a resource reservation network, the method comprising:

receiving bandwidth allocation requests from nodes of said network;

generating a media access plan (MAP) in response to said requests, said MAP having transmission opportunities (TXOPs) allocated to service flows associated with said nodes of said network;

receiving requests for shifting the timing of the allocation of existing TXOPs allocated to constant data service flows of said nodes in order to minimize a delay between the arrival timing of said APDUs at said nodes and their transmittal by said nodes to said network;

shifting said existing allocation for subsequent said TXOPs according to an amount of shift indicated in said allocation shifting requests, and generating an updated MAP with adjusted TXOP allocations and transmitting said updated MAP to said nodes of said network.

* * * * *